United States Patent [19]

Palazzetti et al.

[11] 4,321,798
[45] Mar. 30, 1982

[54] METHOD FOR HEATING WATER USED IN AN APPLIANCE CONNECTED INTO A DOMESTIC WATER CIRCUIT AND THE APPARATUS FOR CARRYING OUT SAID METHOD

[75] Inventors: Mario Palazzetti, Avigliana; Giuseppe Cane, Sangano, both of Italy

[73] Assignee: Centro Ricerche Fiat S.p.A., Turin, Italy

[21] Appl. No.: 201,996

[22] Filed: Oct. 29, 1980

[30] Foreign Application Priority Data

Oct. 30, 1979 [IT] Italy ................................ 69117 A/79

[51] Int. Cl.³ ........................... F25B 7/00; F25B 27/02
[52] U.S. Cl. ........................................ 62/79; 62/238.6; 165/DIG. 12
[58] Field of Search .................... 62/238.6, 79, 260; 165/DIG. 12, 35

[56] References Cited

U.S. PATENT DOCUMENTS

| | | | |
|---|---|---|---|
| 2,375,157 | 5/1945 | Wilkes et al. | 62/238.6 |
| 3,188,829 | 6/1965 | Siewert et al. | 62/238.6 |
| 3,986,344 | 10/1976 | Newman | 62/260 |
| 4,098,092 | 7/1978 | Singh | 62/238.6 |
| 4,207,752 | 6/1980 | Schwarz | 165/35 |
| 4,241,588 | 12/1980 | Murphy et al. | 62/238.6 |

FOREIGN PATENT DOCUMENTS 2304537 8/1974 Fed. Rep. of Germany ... 165/DIG. 12

Primary Examiner—Lloyd L. King
Attorney, Agent, or Firm—Frost & Jacobs

[57] ABSTRACT

The method is intended for heating water used in an appliance connected into a domestic water circuit comprising a feed branch for continuously feeding hot water to said appliance and a discharge branch for discharging the water from the appliance; it comprises a first stage in which a first quantity of heat withdrawn from the water passing through a first portion of said discharge branch is transferred to the water passing through a first portion of said feed branch, said first stage being carried out by means of a first heat exchanger traversed by the water of said feed and discharge branches, and a second stage in which a second quantity of heat given up by a fluid traversing the condenser of a heat pump is transferred to the water passing through a second portion of said feed branch which is downstream of said first portion, said second stage being carried out by means of a second heat exchanger traversed by the water of said feed branch and by said fluid, said second quantity of heat being partly supplied by the work of compression of a compressor of said heat pump, and partly by a further quantity of heat transmitted to the evaporator of said heat pump by the water passing through a second portion of said discharge branch, downstream of said first portion.

2 Claims, 4 Drawing Figures

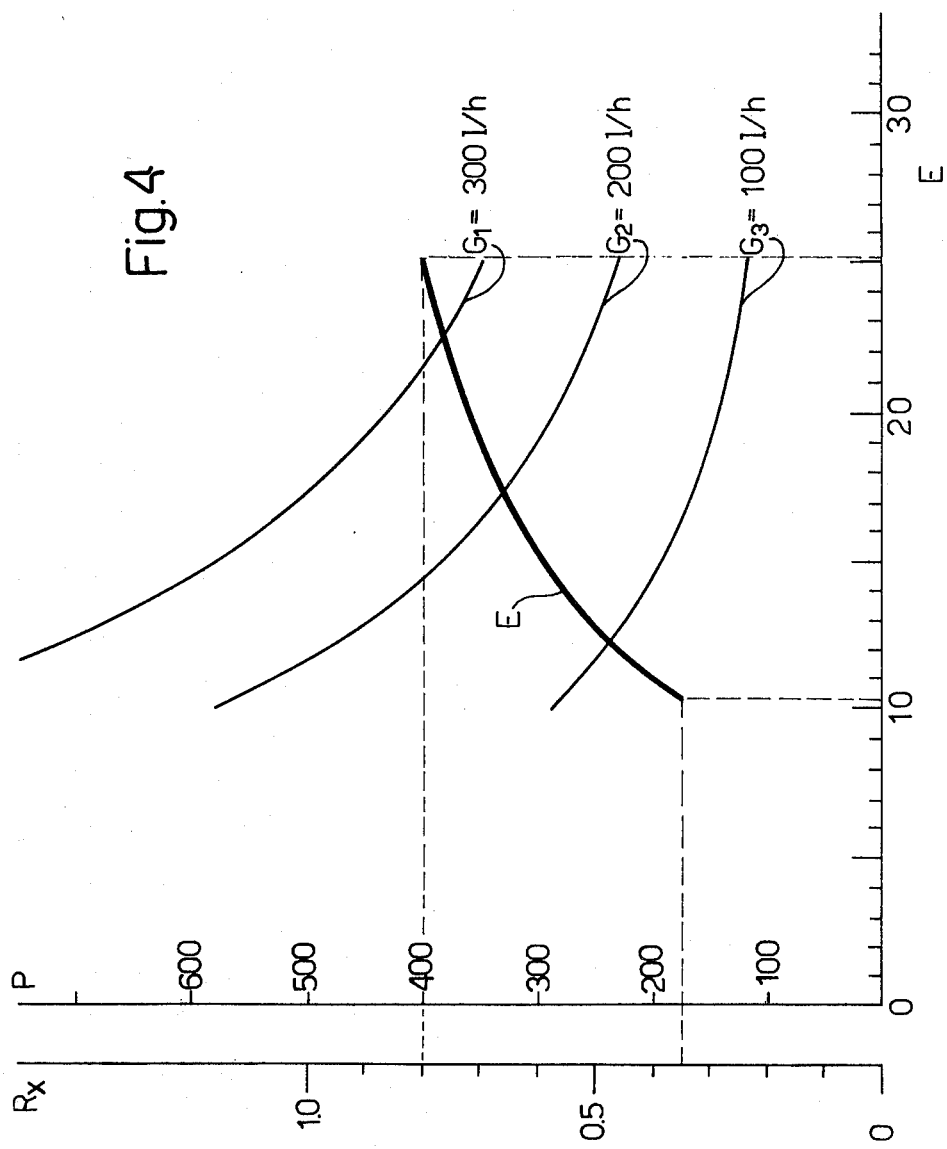

METHOD FOR HEATING WATER USED IN AN APPLIANCE CONNECTED INTO A DOMESTIC WATER CIRCUIT AND THE APPARATUS FOR CARRYING OUT SAID METHOD

SUMMARY OF THE INVENTION

This invention relates to a method for heating water used in an appliance connected into a domestic water circuit, comprising a feed branch for continuously feeding water at a substantially constant predetermined temperature to said appliance, and a discharge branch for discharging the water from the appliance.

The water is heated by utilising both the heat energy recovered from the water discharged by the appliance which has used it, and a small quantity of energy supplied by an external energy source. The invention also relates to an apparatus for carrying out said method, which is very simple and reliable, and is of very small overall size.

The process of the invention is characterised by comprising a first stage in which a first quantity of heat withdrawn from the water passing through a first portion of said discharge branch is transferred to the water passing through a first portion of said feed branch, said first stage being carried out by means of a first heat exchanger traversed by the water of said feed and discharge branches, and a second stage in which a second quantity of heat given up by a fluid traversing the condenser of a heat pump is transferred to the water passing through a second portion of said feed branch which is downstream of said first portion, said second stage being carried out by means of a second heat exchanger traversed by the water of said feed branch and by said fluid, said second quantity of heat being partly supplied by the work of compression of the compressor of said heat pump, and partly by a further quantity of heat transmitted to the evaporator of said heat pump by the water passing through a second portion of said discharge branch, downstream of said first portion, the transfer of said further quantity of heat being carried out by means of a third heat exchanger traversed by the water of said discharge branch and by said fluid.

The apparatus of the invention is characterised by comprising a first heat exchanger traversed by the water of said feed and discharge branches and arranged to transfer to the water passing through a first portion of said feed branch a first quantity of heat withdrawn from the water passing through a first portion of said discharge branch, a second heat exchanger through which the water of said feed branch passes, and which is traversed by the condenser of a heat pump and is arranged to transfer to the water passing through a second portion of said feed branch, located downstream of said first portion, a second quantity of heat given up by a fluid traversing said condenser, and a third heat exchanger through which the water of said discharge branch passes, and which is traversed by the evaporator of said heat pump and is arranged to transfer to the fluid passing through said evaporator a quantity of heat withdrawn from the water passing through a second portion of said discharge branch downstream of said first portion.

BRIEF DESCRIPTION OF THE DRAWINGS

The method and apparatus of the present invention will be more apparent from the detailed description given hereinafter with reference to the figures of the accompanying drawings in which:

FIG. 4 is a diagram showing how the efficiency of the method varies for different operating conditions obtained by varying the value of one parameter of the apparatus.

DETAILED DESCRIPTION OF THE INVENTION

Figure 1:
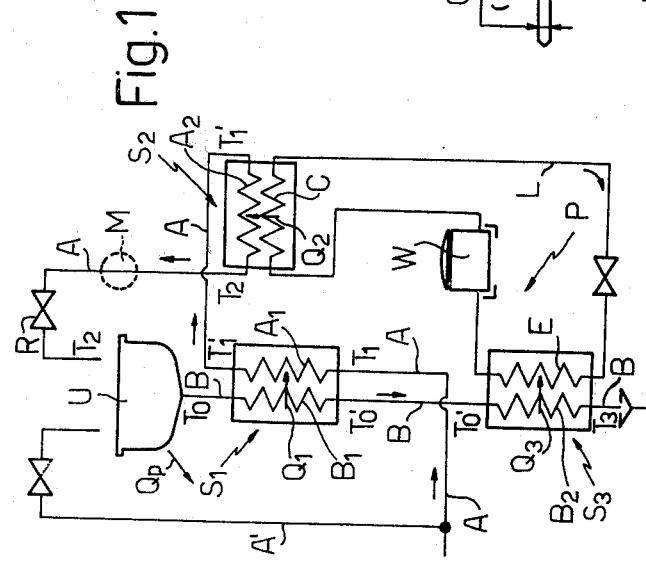
FIG. 1 is a diagrammatic view of one embodiment of the apparatus according to the invention.

Before describing the various stages of the method according to the invention, one embodiment of the apparatus itself for carrying out the method, and shown in FIG. 1, will be examined.

An appliance which continuously utilises a flow of hot water and then continuously discharges it, indicated by U in FIG. 1, and of any type such as a wash basin, a dishwasher, a washing machine, a shower or the like, is connected into a domestic water circuit. This circuit comprises a first feed branch indicated by A for feeding hot water to the appliance U through a tap R from a water source (not shown) such as the normal drinking water supply main. The water entering said feed branch A at the normal supply temperature is heated in the manner described hereinafter as it passes along it, and is fed at a predetermined utilisation temperature to the appliance U. Said circuit also comprises a discharge branch indicated by B for conveying the water used in the appliance U to the drain.

Conveniently, a third circuit branch A' feeds cold water to the appliance U from the supply main.

The apparatus of the invention comprises a first heat exchanger $S_1$ connected into a first portion $A_1$ of the feed branch A and into a first portion $B_1$ of the discharge branch B. This heat exchanger, of the water-water type, is arranged to transfer a first quantity of heat $Q_1$ from the water passing through the first portion $B_1$ of the discharge branch B to the water passing through the first portion $A_1$ of the feed branch A. Conveniently, the two water streams moving in the portions $A_1$ and $B_1$ flow counter-currently as shown in FIG. 1.

The system also comprises a second heat exchanger $S_2$ connected into a second portion $A_2$ of the feed branch A, located downstream of the preceding branch $A_1$. This heat exchanger incorporates the condenser C of a hat pump indicated overall by P and comprising, in addition to said condenser, an evaporator E and a gas compressor W, which are connected in series with each other in known manner as shown in FIG. 1, to form a closed circuit L through which a suitable refrigerant fluid, for example freon gas, flows in the direction of the arrow.

The heat exchanger $S_2$ is thus traversed by the water which passes through the second portion $A_2$ of the feed branch A, and by the refrigerant fluid which passes through the condenser C, and it therefore transfers a second quantity of heat $Q_2$ to said water by withdrawing it from the fluid itself. Conveniently, water and the refrigerant fluid flow counter-currently, as shown in FIG. 1.

Finally, the system comprises a third heat exchanger $S_3$, which is connected into a second portion $B_2$ of the discharge branch B (located downstream of the preceding branch $B_1$), and which incorporates the evaporator E of the heat pump P. The heat exchanger $S_3$ is thus traversed by the water which passes through the second portion $B_2$ of the discharge branch B and by the refrigerant fluid which passes through the evaporator E, and thus transfers to said fluid a third quantity of heat indicated by $Q_3$.

As the fluid used in the circuit of the heat pump P is a gas, for example freon, which can be compressed by the compressor W until it liquefies, this fluid is respectively in the liquid state and gaseous state in the condenser C and evaporator E respectively. The heat exchangers $S_2$ and $S_3$ can therefore be of any type suitable for providing, in each of the two cases, effective heat transfer between the hydraulic fluid existing in one of the two said states and the water passing through the heat exchangers.

According to the method of the invention, which is carried out by using the described system, the water which is passed continuously through the feed branch A of the circuit can be heated to a predetermined utilisation temperature $T_2$.

It will be assumed that the water supplied to the appliance U at a temperature $T_2$ is discharged from the appliance at a temperature $T_o < T_2$. The water passing through the first portion $B_1$ of the discharge branch B inside the first heat exchanger $S_1$ gives up a quantity of heat $Q_1$ by simple heat transfer to the water passing through the first portion $A_1$ counter-currently, this quantity depending essentially on the characteristics of the heat exchanger $S_1$. It follows that the temperature of the discharge water leaving the heat exchanger $S_1$ is reduced to a temperature $T_o' < T_o$, while that passing through the portion $A_1$ of the feed branch A is heated from the supply temperature $T_1$ to a higher temperature $T_1'$.

In the second portion $A_2$ inside the heat exchanger $S_2$, the water passing through the feed branch A undergoes a second heating from the temperature $T_1'$ to the temperature $T_2$. This is obtained by the quantity of heat $Q_2$ which is transferred to the water inside the heat exchanger by the refrigerant fluid traversing the condenser C. This quantity of heat obviously depends on the characteristics of the heat pump P.

The quantity of heat $Q_2$ transferred in this manner is represented by the quantity which the heat pump P makes available to the condenser C, and which is previously supplied to the refrigerant fluid by the quantity of heat $Q_3$ as a consequence of the heat exchange which takes place in the heat exchanger $S_3$, and by the work of compression W which is done inside the compressor W. In this respect, a heat pump is able to supply at a higher thermal level (at the condenser C) a quantity of heat ($Q_2$) equal to the sum of that supplied at a lower thermal level to the evaporator E ($Q_3$) and that corresponding to the work of compression W done by the compressor W.

The quantity of heat $Q_3$ is supplied to the fluid of the evaporator E by simple heat transfer inside the heat exchanger $S_3$, by withdrawing it from the discharge water passing through the second portion $B_2$ of the discharge branch B. The discharge water leaving the heat exchanger $S_3$ therefore has a temperature $T_3$ less than the inlet temperature in the heat exchanger itself, $T_o'$. As will be more apparent hereinafter, the temperature $T_3$ can be greater than, less than or equal to the temperature $T_1$ of the main supply as the operating conditions of the apparatus are varied.

Figure 2:
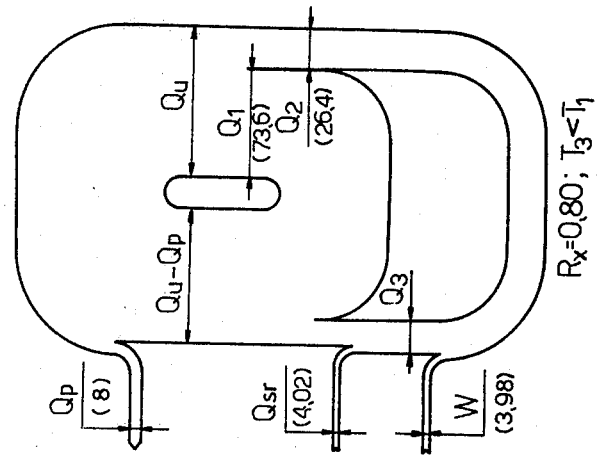
FIGS. 2 and 3 are diagrams showing the energy flow through the various components of the apparatus.
Figure 3:
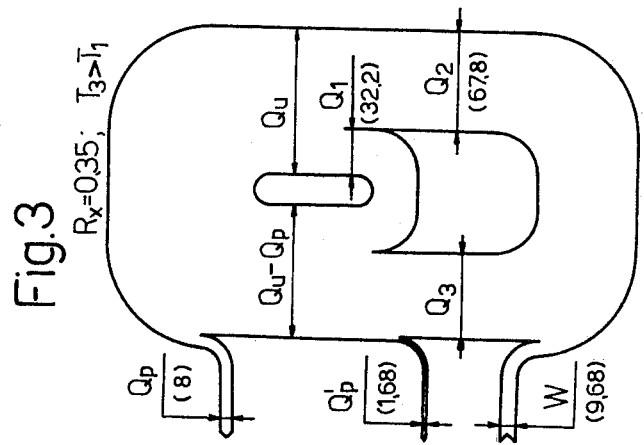

The described operation can be followed on the diagrams of FIGS. 2 and 3, in which the thermal energy flows which occur in the energy balance of the apparatus are shown. The two diagrams, which indicate the numerical values of the percentages of each of the component flows, relate to two different apparatus conditions which are obtained by connecting two different heat exchangers $S_1$ into it. The efficiency of the heat transfer which takes place in a heat exchanger is known to depend on the recovery factor $R_x$, defined as the ratio between the thermal power transmitted by the heat exchanger and the thermal power available. In the case of the heat exchanger $S_1$, as heat transfer takes place between fluids of the same type (water), then:

$$R_x - (T_1' - T_1)/(T_o - T_1)$$

The two diagrams of FIGS. 2 and 3 have been obtained by thermal calculations assuming that heat exchangers $S_1$ having a recovery factor $R_x$ equal respectively to 0.35 and 0.80 have been connected into the apparatus (these values can be considered to be two limiting cases for heat exchangers suitable for application to the apparatus of the invention), and assuming the following basic temperatures:

$$T_1 = 15° \text{ C.}; T_2 = 40° \text{ C.}; T_o = 38° \text{ C.}$$

It has also been assumed that a loss of thermal energy $Q_P$ takes place inside the apparatus U equal to 8% of that available at the tap R in the feed line A, this being indicated by $Q_u$.

These assumptions have been used to obtain the thermal flows shown in the diagrams of FIGS. 2 and 3, from which it can be noted that of the thermal energy available at the point of utilisation $Q_u$, a fraction $Q_o$ is dispersed in the appliance, and the remainder $Q_u - Q_p$ is transferred to the apparatus of the invention. The thermal energy $Q_1$ is firstly recovered in the heat exchanger $S_1$, this being a proportion of the available energy $Q_u$ which obviously depends on the recovery factor $R_x$ of the heat exchanger itself. As $R_x$ increases, the heat energy $Q_1$ transferred by pure heat transfer also increases.

The water entering the heat exchanger $S_3$ still has a residual thermal energy of $Q_u - Q_p - Q_1$, if it is assumed that the water discharge temperature $T_3$ is equal to the feed temperature $T_1$ of the main supply water. If this is not so, as is the case in FIG. 2 in which $T_3 < T_1$, it must be assumed that an energy quantity $Q_{sr}$ enters the energy flow transmitted by the heat exchanger $S_3$, this energy quantity being equal to the heat involved in sub-cooling the water at the discharge to a temperature $T_3$ which is lower than $T_1$. If the condition shown in FIG. 3 occurs in which $T_3 \, T_1$, it must be assumed that not all the available energy in the discharge water is used, and therefore there is a corresponding energy loss $Q_p'$ before the heat exchanger $S_3$, this determining a corresponding reduction in the energy flow transmitted by the exchanger.

In both cases, the energy indicated by W due to the work of compression done by the compressor W is inserted into the thermal energy flow downstream of the heat exchanger $S_3$. An energy flow equal to $Q_3 + W = Q_2$ is transmitted to the water in the heat exchanger $S_2$.

As can be seen from the diagrams of FIGS. 2 and 3, the energy which has to be supplied to the apparatus of the invention in order to keep the water utilisation temperature $T_2$ constant is merely that given by the sum $W + Q_{sr} = Q_p$ (case of FIG. 2), or by the difference $W - Q_p' = Q_p$ (case of FIG. 3). As said sum and difference are always equal to the energy loss $Q_p$ in the appliance U and in the pipes, only the energy dispersed in the appliance has to be supplied to the system. Because of the small value of the energies $Q_{sr}$ and $Q_p'$, it can also be concluded that with a good approximation the energy to be supplied mechanically to the system (W) is equal merely to that dispersed in the user item ($Q_p$).

The values of $Q_{sr}$, $Q_p$ and W depend both on the values of the parameters heretofore defined and on the performance factor of the pump W, this factor being usually indicated by COP, and defined as:

$$COP = (Q_2/W)$$

Table 1 shows the values of some of the parameters heretofore defined, obtained for different values of the recovery factor $R_x$.

TABLE 1

| $R_x$ | $T_0'$ (°C.) | $T_1'$ (°C.) | $T_3$ (°C.) | COP | $Q_p$ % | $Q_{sr}$ % | $Q_p'$ % | $Q_1$ % | W % | E |
|---|---|---|---|---|---|---|---|---|---|---|
| 0.80 | 19.60 | 33.4 | 13.99 | 6.618 | 8 | 4.02 | — | 73.6 | 3.98 | 25.12 |
| 0.65 | 23.05 | 29.95 | 14.48 | 6.745 | 8 | 2.04 | — | 59.8 | 5.96 | 16.78 |
| 0.50 | 26.5 | 26.5 | 14.96 | 6.875 | 8 | 0.1 | — | 46 | 7.90 | 12.66 |
| 0.35 | 29.95 | 23.05 | 15.42 | 7.003 | 8 | — | 1.68 | 32.2 | 9.68 | 10.33 |

FIG. 4 shows a diagram (curve E) representing the variation of the efficiency of the method, defined as $E = (Q_u/W)$, i.e. the ratio of the energy available to that supplied to the apparatus for driving the compressor W of the pump P, as the recovery factor $R_x$ varies. The same figure shows a family of curves (curves $G_i$) which enable the power P necessary for driving the compressor W for various fluid throughputs to be determined (right hand scale).

As can be seen from curve E, as the recovery factor $R_x$ of the heat exchanger $S_1$ increases, the efficiency E increases. This is already satisfactory even for low values of $R_x$ (E = 10 for $R_x = 0.35$), but becomes very large for higher values of $R_x$ (E = 25 for $R_x = 0.80$). For each efficiency value E, the curve $G_1$ gives the power P necessary for a predetermined throughput.

From these results it can be seen that with the method according to the invention, it is possible to recover a predetermined amount of energy from the water discharged from the appliance U by supplying a quantity of external energy which is equal only to a small fraction of the energy itself (this fraction is 1/10 and 1/25 for the two limiting cases stated). With the method of the invention, it is therefore possible to completely recover the thermal energy contained in the water discharged from the appliance U and feed this water to drain at a temperature $T_3$ which is equal to or different from the supply main temperature $T_1$.

This recovery is possible by means of a very simple and therefore highly reliable apparatus which has a very small overall size, as is required for constructing said apparatus in the form of a small compact unit suitable for easy connection into the appliance or in the immediate vicinity of it.

Furthermore, the power required for operating the apparatus is also very low, as it corresponds only to that necessary for operating the motor (preferably electric) which drives the compressor W.

These favourable results, and in particular the small overall size and power, derive from having provided two successive stages for transferring thermal energy to the water which passes through the feed branch A, these stages being carried out by the heat exchangers $S_1$ and $S_2$ respectively. In this manner, only the fraction $Q_2/Q_u$ of the available energy $Q_u$ is made up by using a heat pump. Thus as this pump has to transfer only a small quantity of thermal energy from a first to a second thermal level, it requires a compressor and motor of small size, and therefore leads to very small overall dimensions.

A small vessel M can conveniently be connected into the branch A downstream of the heat exchanger $S_2$ to act as a thermal accumulator in this branch, or alternatively the actual condenser C could perform this function.

What we claim is:

1. A method for heating water used in an appliance connected into a domestic water circuit comprising a feed branch for continuously feeding hot water to said appliance and a discharge branch for discharging the water from the appliance, characterised by comprising a first stage in which a first quantity of heat withdrawn from the water passing through a first portion of said discharge branch is transferred to the water passing through a first portion of said feed branch, said first stage being carried out by means of a first heat exchanger traversed by the water of said feed and discharge branches, and a second stage in which a second quantity of heat given up by a fluid traversing the condenser of a heat pump is transferred to the water passing through a second portion of said feed branch which is downstream of said first portion, said second stage being carried out by means of a second heat exchanger traversed by the water of said feed branch and by said fluid, said second quantity of heat being partly supplied by the work of compression of a compressor of said heat pump, and partly by a further quantity of heat transmitted to the evaporator of said heat pump by the water passing through a second portion of said discharge branch, downstream of said first portion, the transfer of said further quantity of heat being carried out by means of a third heat exchanger traversed by the water of said discharge branch and by said fluid.

2. An apparatus for heating water used in an appliance connected into a domestic water circuit comprising a feed branch for continuously feeding hot water to said appliance and a discharge branch for discharging the water from said appliance, characterised by comprising a first heat exchanger traversed by the water of said feed and discharge branches and arranged to transfer to the winter passing through a first portion of said feed branch a first quantity of heat withdrawn from the water passing through a first portion of said discharge branch, a second heat exchanger through which the water of said feed branch passes, and which is traversed by the condenser of a heat pump and is arranged to transfer to the water passing through a second portion of said feed branch, located downstream of said first portion, a second quantity of heat given up by a fluid traversing said condenser, and a third heat exchanger through which the water of said discharge branch passes, and which is traversed by the evaporator of said heat pump and is arranged to transfer to said fluid passing through said evaporator a quantity of heat withdrawn from the water passing through a second portion of said discharge branch downstream of said first portion.

* * * * *